United States Patent Office 3,435,262
Patented Mar. 25, 1969

3,435,262
COOLING ARRANGEMENT FOR STATOR END PLATES AND EDDY CURRENT SHIELDS OF ALTERNATING CURRENT GENERATORS
Roy Brian Bennett and William Carmichael Blair, Stafford, England, assignors to The English Electric Company Limited, London, England, a British company
Filed June 6, 1967, Ser. No. 643,956
Claims priority, application Great Britain, June 7, 1966, 25,252/66
Int. Cl. H02k 9/20
U.S. Cl. 310—54                           7 Claims

ABSTRACT OF THE DISCLOSURE

In alternating current generators it is necessary to place a copper screen over each stator core end plate to prevent axial leakage flux from entering the stator core and this invention is concerned with the cooling of the stator core end plates and associated screens. The invention, which is primarily intended for use with large turbo-alternators, provides separate arrangements of cooling ducts for the flow of a cooling fluid for cooling the screens, the end plates and also the teeth of the end plates.

---

This invention relates to the cooling of alternating current generators and more particularly to the cooling of the stator core end plates and associated screens.

In an alternating current generator leakage flux would normally enter the stator core axially and thus set up eddy currents in the stator core laminations and end plates. In order to prevent this axial leakage flux entering the stator core a copper screen is placed over the outer face of each end plate. Thus the leakage flux generates eddy currents in the copper screen and the resultant magnetic field prevents the leakage flux from entering the core. Such a screen which acts to reduce losses is hereinafter referred to as an eddy current screen.

According to the invention there is provided an alternating current generator stator core end plate and associated eddy current screen both of which are provided with ducts for the passage of cooling fluid.

Preferably the ducts of the end plate and screen are arranged in one or more annular arrangements of ducts.

Preferably the ducts comprise metal tubes disposed in troughs formed in the end plate or screen as the case may be.

An end plate and screen according to the invention may also include cooling ducts for cooling the teeth of the stator core end plate.

According to another aspect of the invention there is provided an alternating current generator having stator core end plates and associated eddy current screens as described above.

In order that the invention may be better understood one core end plate and associated eddy current screen of a large alternating current generator, both incorporating cooling ducts according to the invention, will now be described, by way of example, with reference to the accompanying diagrammatic drawings, in which:

FIG. 1 shows the general arrangement of the core end plate 10 which is made of steel and a portion of the associated eddy current screen 12 which is made of copper. The end plate has teeth generally indicated at 11 and in detail these teeth are as shown in FIG. 2, that is, they are divided by a central aperture 11A so that each tooth consists of two adjacent prongs 11B and 11C.

Figure 5:
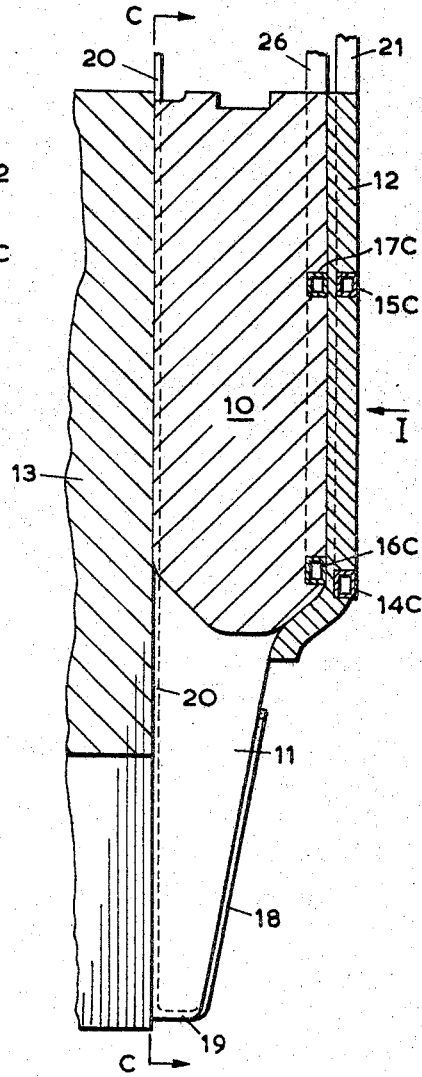
FIG. 5 is a section through FIG. 4 on the line B—B thereof.

The end plate 10 is provided with two annular arrangements of cooling ducts comprised of six arcuate ducts 16A to 16F which form one of the annular arrangements, and six arcuate ducts 17A to 17F which form the other annular arrangement. The ducts 16 and 17, A to F are disposed in troughs in one face of the end plate as can be seen in FIG. 5. Each end of each of the arcuate ducts 16A to 16F is connected to an associated radially extending duct 26 and each end of each of the arcuate ducts 17A to 17F is connected to an associated radially extending duct 25. These radially extending ducts which are also disposed in troughs in the end plate are arranged in sets of four, two ducts 25 and two ducts 26 and alternate ones of these sets of four ducts are connected to respective liquid inlet and outlet manifolds (not shown).

Cooling liquid, preferably water, is supplied to the ducts from the inlet manifold and passes circumferentially around one sixth of each annular cooling arrangement before passing to the outlet manifold.

Figure 4:
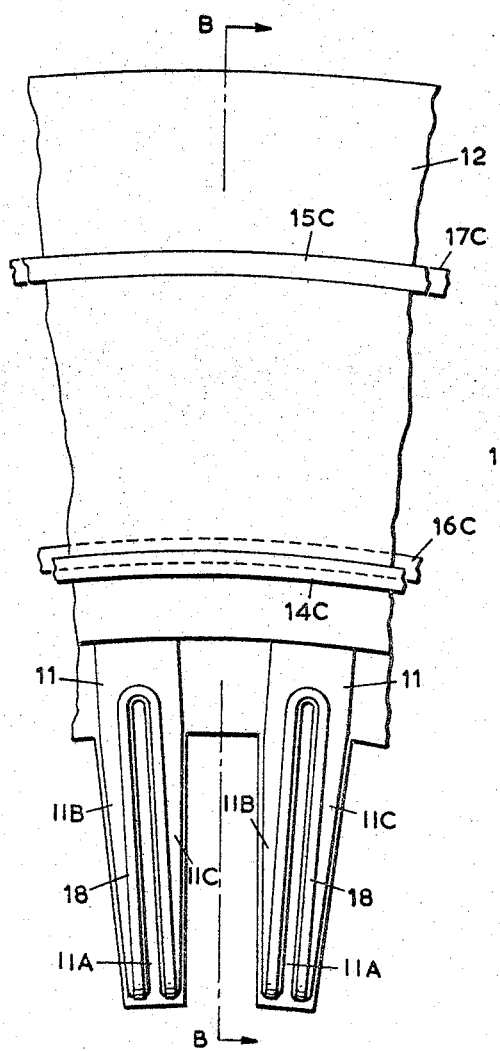
FIG. 4 is a more detailed view of part of FIG. 1 as it appears in the sector between lines A and A' of FIG. 1.

FIG. 5 which is a section through FIG. 4 shows further details of the end plate cooling ducts. In FIG. 5 the end plate 10 is shown in position disposed adjacent the end of the stator core 13 with the two ducts 16C and 17C disposed in the troughs in the outer face of the end plate. All of the other ducts 16 and 17 are similarly disposed in troughs and the ducts are preferably formed of copper tube.

Figure 1:
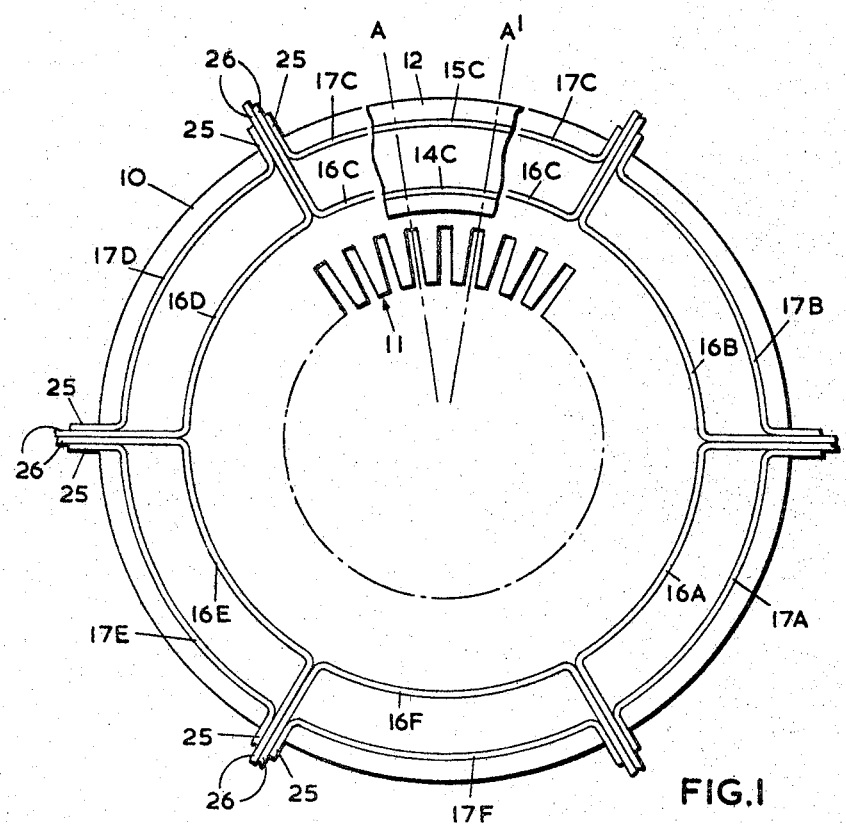
FIG. 1 shows diagrammatically the core end plate and cooling ducts together with a portion of the eddy current screen in position adjacent the end plate.
Figure 2:
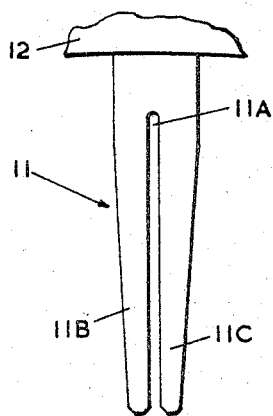
FIG. 2 shows details of the tooth of the core end plate.
Figure 3:
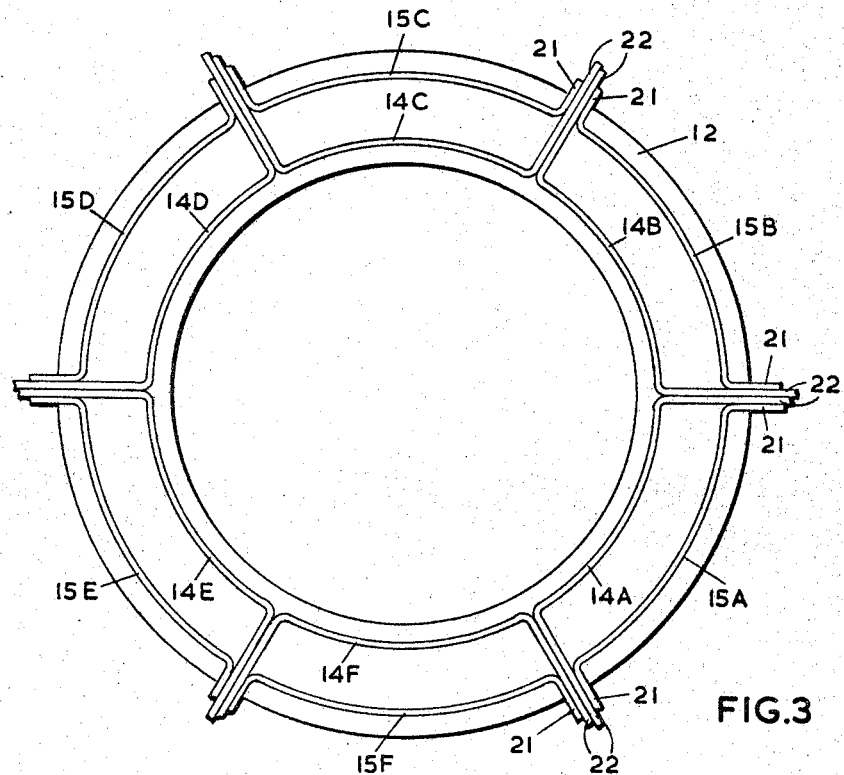
FIG. 3 shows diagrammatically the eddy current screen and cooling ducts.

Turning now to FIG. 3 it will be seen that the eddy current screen cooling arrangement also comprises two annular arrangements of cooling ducts similar to that of the end plate and is comprised of six arcuate ducts 14A to 14F which form one of the annular arrangements and six arcuate ducts 15A and 15F which form the other annular arrangement. The ducts 14 and 15, A to F are disposed in troughs in the screen as can be seen in FIG. 5.

Each end of each of the arcuate ducts 14A to 14F is connected to an associated radially extending duct 22 and each end of each of the arcuate ducts 15A to 15F is connected to an associated radially extending duct 21. These radially extending ducts which are also disposed in troughs in the screen are also arranged in sets of four, two ducts 21 and two ducts 22 and alternate ones of these sets of ducts are connected to respective liquid inlet and outlet manifolds (not shown) in the same manner as the radial ducts of the core end plate.

The manifolds for conveying liquid to and from the screen cooling ducts may be common to both the screen and end plate cooling arrangements.

FIG. 5 shows the disposition of the screen 12 immediately adjacent the core end plate 10 with the ducts 14C and 15C disposed in the troughs in the outer face of the end plate. All of the other ducts 14 and 15 are similarly disposed in troughs and preferably all these ducts are formed of copper tube which is soft soldered into the troughs in the copper screen.

Figure 6:
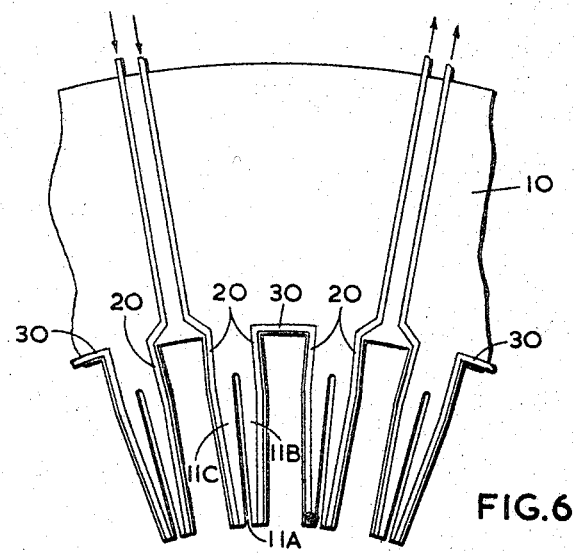
FIG. 6 is a view of part of the back of the core end plate as seen on the line C—C of FIG. 5.

Further ducts are provided for cooling the core end plate teeth 11 and the arrangements of these ducts is shown in FIGS. 4, 5 and 6. Each tooth carries on its outer faces a duct portion 18 which extends from the tip of one prong of the tooth to the root thereof, around the end of the central aperture 11A and back to the tip of the other prong of the tooth. At the tips of the two prongs the duct portion 18 is recessed into the tooth as shown at 19, FIG. 5.

After passing to the back of the core end plate tooth each end of each duct portion 18 connects with, or is continued as, a duct 20 disposed in a trough at the back face of the core end plate as shown by the broken lines in FIG. 5.

FIG. 6 shows the arrangement of the ducts 20 at the inner face of the core end plate in an arrangement which connects adjacent ends of adjacent duct portions 18 in series by means of circumferentially extending duct portions 30.

The ducts 20 at the other two ends of each series circuit so formed are extended outwardly to connect with manifolds (not shown) and FIG. 6 shows arrows indicating the coolant liquid flow into and out of the tooth cooling arrangement.

Whilst the invention has been described in relation to complete annular arrangements of six arcuate ducts more or fewer ducts could be used for each annular arrangement of the ducts for both the end plate and screen.

Further it is not necessary that the ducts 14, 15, 16 and 17, A to F be arcuate, they could be straight and arranged in the form of two hexagons. Alternatively the ducts could be arcuate but of a different radius from that shown in the drawing. It should be understood therefore that the invention is not limited to the exact annular arrangements of the sets of six arcuate ducts described in relation to FIGS. 1 to 6.

Whilst the tooth cooling has been described in relation to an arrangement in which adjacent duct portions 18 are connected in series to form a cooling circuit more than two duct portions could be connected in series in a cooling circuit. Alternatively each tooth could be provided with a separate cooling circuit.

Whilst the invention has been described in relation to cooling ducts provided in the outer faces of both the screen and core end plate the cooling ducts of either could be provided in the inner face thereof.

If desired the end plate could have cooling ducts in both the inner and outer faces thereof, and the screen could be similarly provided with ducts in both faces.

Although a complete stator has not been illustrated in the drawings it is to be understood that the core is of the usual construction. That is, it includes an annular arrangement of laminations (as indicated in the lower part of FIG. 5) of magnetic material with the laminations clamped between two end plates, the annular arrangement of laminations having teeth between which are slots for accommodating the stator winding. The copper screens are also of the usual type, each screen being electrically in contact with its associated end plate but not necessarily secured directly thereto.

We claim:
1. A dynamo electric machine having a stator member which includes an annular magnetic core with an annular end plate at each end thereof and an annular eddy current screen on the outer face of each end plate, each end plate and each screen having cooling ducts for the passage of a cooling fluid for cooling the end plates and screens.

2. A dynamo electric machine according to claim 1 in which the ducts of the end plate are disposed in at least one generally annular arrangement which comprises a plurality of arcuate duct portions connected between radially extending duct portions for conveying cooling fluid to and from the arcuate duct portions.

3. A dynamo electric machine according to claim 1 in which the ducts of the eddy current screens are disposed in at least one generally annular arrangement which comprises a plurality of arcuate duct portions connected between radially extending duct portions for conveying cooling fluid to and from the arcuate duct portions.

4. A dynamo electric machine according to claim 1 in which each end plate is formed with troughs in at least one face thereof, the said ducts being provided by metal tubes disposed within the troughs.

5. A dynamo electric machine according to claim 1 in which each eddy current screen is formed with troughs therein, the ducts being provided by metal tubes disposed within the troughs.

6. A dynamo electric machine according to claim 1 in which each annular end plate has split teeth extending radially inwards from the inner periphery thereof and including ducts for cooling the teeth, these ducts including portions which extend radially from the outer periphery of the end plate on the inner face thereof, down one side of a tooth, across the inner peripheral edge of the tooth, along the face of the tooth around the slot, back across the inner peripheral edge of the tooth and back along the other side of the back of the tooth.

7. A dynamo electric machine according to claim 1 in which each annular end plate has teeth extending radially inwards from the inner periphery thereof and including ducts for cooling said teeth in which a cooling duct of any one tooth is connected in series with a cooling duct of at least one other tooth.

References Cited

UNITED STATES PATENTS

| | | | |
|---|---|---|---|
| 1,685,054 | 9/1928 | Hibbard | 310—65 |
| 2,742,583 | 4/1956 | Beckwith | 310—64 |
| 2,833,944 | 5/1958 | Willyoung | 310—64 |

WARREN E. RAY, *Primary Examiner.*

R. SKUDY, *Assistant Examiner.*

U.S. Cl. X.R.

310—64, 260